(12) United States Patent
Gibson et al.

(10) Patent No.: US 10,069,416 B2
(45) Date of Patent: Sep. 4, 2018

(54) BUCK-BOOST CONVERTER CONTROLLER

(71) Applicant: Texas Instruments Incorporated, Dallas, TX (US)

(72) Inventors: Neil Gibson, Freising (DE); Antonio Priego, Freising (DE); Erich Bayer, Thonhausen (DE); Joerg Kirchner, Mauern (DE); Michael Lueders, Freising (DE); Stefan Herzer, Marzling (DE); Michael Couleur, Bavaria (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/377,075

(22) Filed: Dec. 13, 2016

(65) Prior Publication Data
US 2018/0166990 A1 Jun. 14, 2018

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ... H02M 3/157; H02M 3/1582; H02M 3/1588
See application file for complete search history.

(56) References Cited

U.S. PATENT DOCUMENTS

| 7,863,833 | B2 * | 1/2011 | Tamegai | H02M 3/33507 315/291 |
| 8,618,781 | B2 * | 12/2013 | Miyamae | H02M 3/157 323/271 |
| 2015/0229215 | A1 * | 8/2015 | Choudhary | H02M 1/14 323/271 |
| 2015/0343492 | A1 * | 12/2015 | Hajati | B06B 1/0622 73/661 |
| 2017/0237336 | A1 * | 8/2017 | Zhak | H02M 1/36 323/311 |
| 2018/0097443 | A1 * | 4/2018 | Couleur | H02M 3/07 |
| 2018/0097513 | A1 * | 4/2018 | Couleur | H03K 7/06 |

* cited by examiner

*Primary Examiner* — Kyle J Moody
(74) *Attorney, Agent, or Firm* — Tuenlap D. Chan; Charles A. Brill; Frank D. Cimino

(57) ABSTRACT

A controller for a DC-DC converter includes a state machine and a plurality of drivers for controlling switches in the DC-DC converter, where each state in the state machine determines a state of the drivers, and a plurality of timers, where each state in the state machine, other than a passive state, has an associated timer for the state of the drivers.

17 Claims, 4 Drawing Sheets

BUCK-BOOST CONVERTER CONTROLLER

BACKGROUND

Switching DC-DC voltage converters are commonly used in electronic systems. Variations of DC-DC voltage converters include: buck converters (the output voltage is less than the input voltage), boost converters (the output voltage is greater than the input voltage) and buck-boost converters (the output voltage may be less than, equal to, or greater than the input voltage). Other variations include inverting converters (the output voltage has an inverse polarity relative to the input voltage) and non-inverting converters (the output voltage has the same polarity as the input voltage).

FIG. 1 illustrates an example of a prior-art, four-switch, non-inverting, buck-boost DC-DC voltage converter 100. The converter 100 has an inductor L and four switches (SW1, SW2, SW3, SW4). The switches (SW1, SW2, SW3, SW4) are typically implemented by field-effect transistors. A controller 102 monitors the input and output voltages ($V_{IN}$, $V_{OUT}$) and controls the switches (SW1, SW2, SW3, SW4) in the converter 100. In controller 102, a closed-loop system (not illustrated) adjusts the switching duty cycle based on the difference between $V_{OUT}$ and a reference voltage $V_{REF}$. Typically, the switching cycle frequency is constant except for light loads (as discussed in more detail below).

For reasons that will be discussed in more detail below, the controller 102 typically operates the converter 100 in one of three modes: buck mode (the input voltage is at least 10% greater than the output voltage), buck-boost mode (the output voltage is within +1-10% of the input voltage), and boost mode (the output voltage is greater than 10% above the input voltage).

FIG. 2A illustrates the sequence of switch states when the converter 100 is operating in buck mode. In the buck mode, switch SW2 is always OFF, switch SW4 is always ON, and switches SW1 and SW3 alternate (when one is ON the other is OFF).

FIG. 2B illustrates the sequence of switch states when the converter is operating in boost mode. In the boost mode, switch SW1 is always ON, switch SW3 is always OFF, and switches SW2 and SW4 alternate.

FIG. 2C illustrates the sequence of switch states when the converter 100 is operating in buck-boost mode. In the buck-boost mode, all four switches (SW1, SW2, SW3, SW4) are active, with switches SW1 and SW2 always ON or OFF together, with switches SW3 and SW4 always ON or OFF together, and switch pairs (SW1, SW2) and (SW3, SW4) alternate.

In one of the two switch states in buck mode (FIG. 2A) and in boost mode (FIG. 2B), the voltage across the inductor L is $V_{OUT}-V_{IN}$. In the buck-boost mode, $V_{OUT}-V_{IN}$ can become very small and the current in the inductor L will change very little during the time that the voltage across the inductor is $V_{OUT}-V_{IN}$ is small. Therefore, in the buck-boost mode (FIG. 2C), the voltage across the inductor is either $V_{IN}$ or $V_{OUT}$ to ensure adequate energy storage in the inductor. However, the switching sequence of FIG. 2C is relatively inefficient due to energy losses in switching four switches. Accordingly, in buck mode and boost mode, the converter 100 operates in a relatively efficient two-switch sequence enabled by the magnitude of $V_{OUT}-V_{IN}$.

Another possible mode is light-load (low load current). In light-load conditions the inductor current can fall to zero or even reverse. In general, current reversal results in wasted energy. For efficiency, a controller 102 may include circuitry to detect inductor current reversal and switch to a separate discontinuous conduction mode (DCM). This is also known as a pulse skipping mode. During DCM, the operating frequency of the converter is typically proportional to the load current. Typically, improving efficiency during light-load conditions increases controller complexity and may impact load transient response time.

The controller 102 needs to change modes as the input voltage varies, needs to change modes as the load varies, and needs to respond rapidly to a load transient. The number of possible mode changes and mode change combinations make buck-boost controllers complex, and there are typically trade-offs between controller complexity and efficiency. There is a need for simplification of buck-boost controllers.

DETAILED DESCRIPTION

Figure 1:
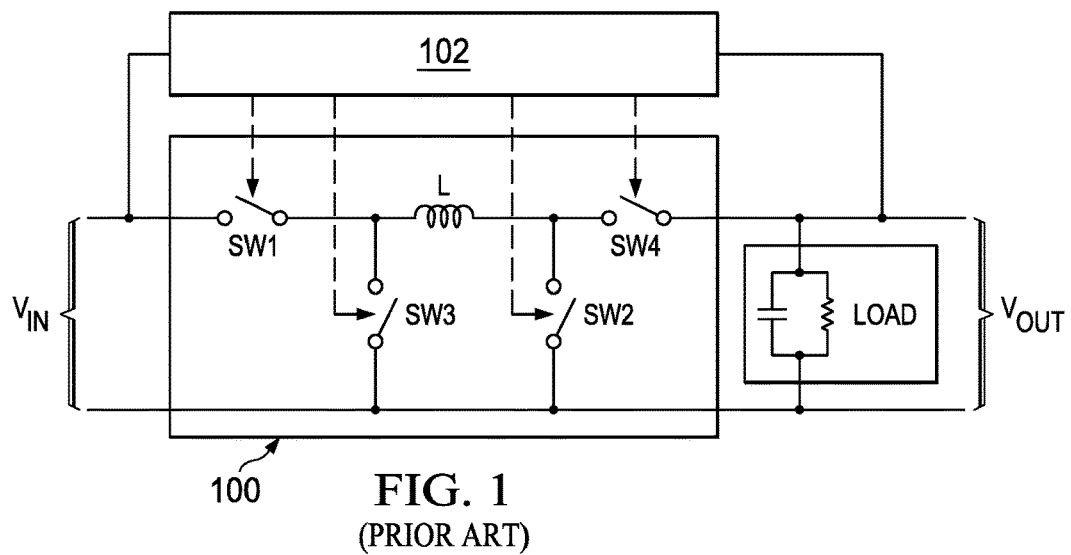
FIG. 1 is a block diagram of an example prior-art four-switch, non-inverting, buck-boost DC-DC voltage converter and a controller.
Figure 3:
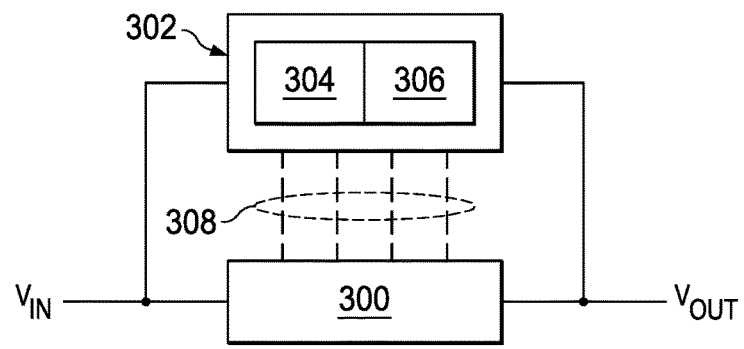
FIG. 3 is a block diagram of an example embodiment of a switching buck-boost DC-DC voltage converter and a controller.

FIG. 3 is a block diagram of an example embodiment of a DC-DC voltage converter 300 being controlled by a controller 302. The converter 300 may be, for example, a four-switch, non-inverting, buck-boost DC-DC voltage converter as illustrated in FIG. 1. That is, the topology of the converter 300 may be as illustrated in FIG. 1, but the controller 302 employs a novel method of controlling the switches.

The controller 302 uses a state machine 304 and a set of timers 306. A set of control lines 308 control switches in the converter 300. The state machine 304 assigns different roles to the timers 306, depending on the mode. The state and timing is determined on a cycle-by-cycle basis. As a result, operation across buck, buck-boost, and boost modes is seamless. In addition, an inherent property of the control scheme is that when the converter 300 is in a light-load condition, the controller 302 automatically maintains the converter 300 in a discontinuous conduction mode (DCM) without requiring measurement of inductor current. In addition, during light-load conditions, the controller 302 operates at an approximately constant switching frequency while maintaining enough inductor current to respond to load transients. The control scheme eliminates the need for complex mode-change circuitry and current-reversal measurements.

Figure 4:
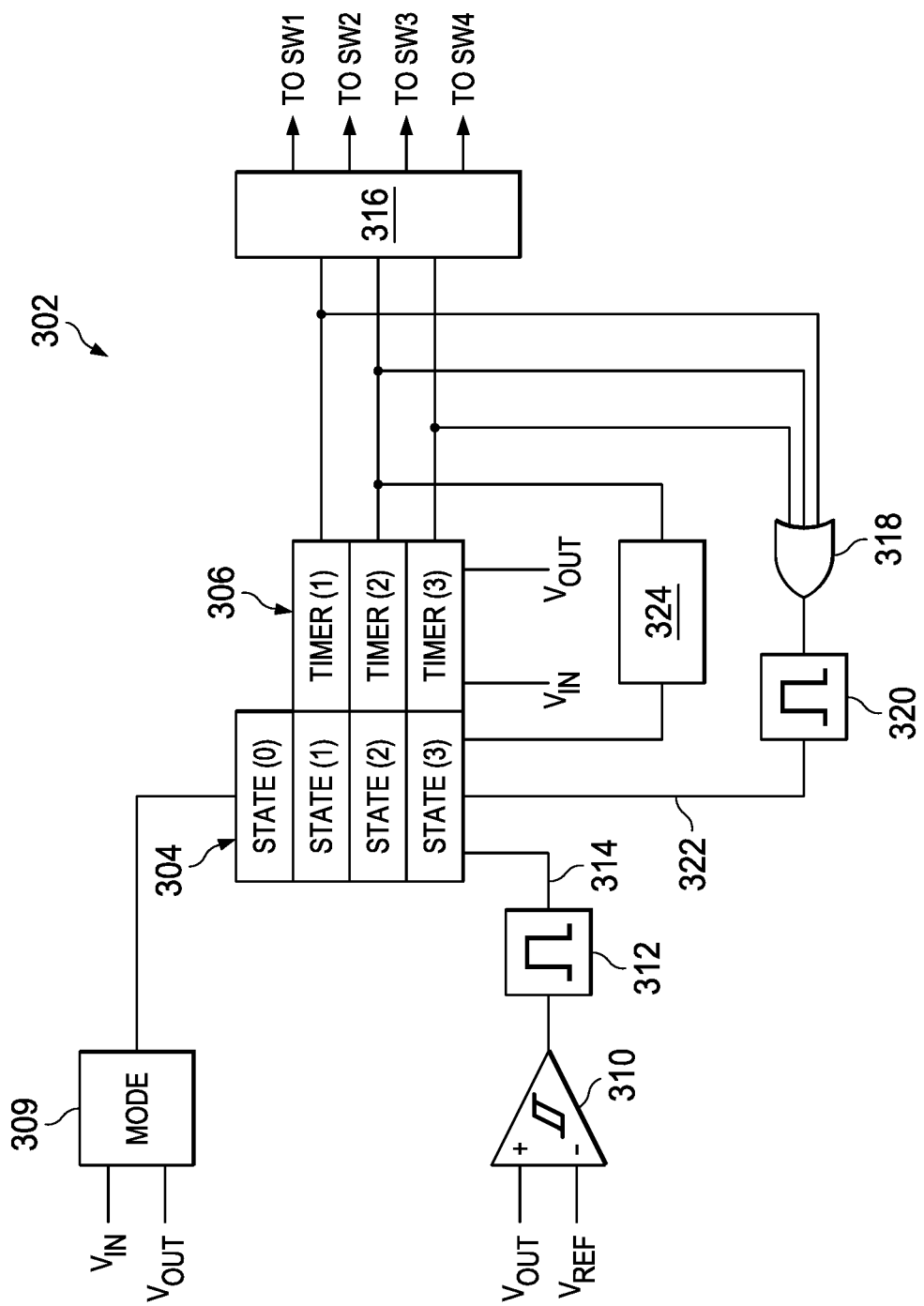
FIG. 4 is a block diagram illustrating example additional detail for the controller of FIG. 3.

FIG. 4 illustrates example additional detail for the controller 302 in FIG. 3. A mode control element 309 (for example, a window comparator) receives the output voltage $V_{OUT}$ and the input voltage $V_{IN}$ and determines whether the converter 300 is operating in a buck mode, boost mode, or buck-boost mode. A comparator 310 compares the output voltage $V_{OUT}$ to a reference voltage $V_{REF}$. If $V_{OUT}$ is less than $V_{REF}$ (assuming a non-inverting converter), then the comparator 310 and a pulse generator 312 generate a trigger signal 314. The trigger signal 314 initiates a sequence of states in the state machine 304. The state machine 304 has four states (STATE(0), STATE(1), STATE(2), STATE(3)). Each state specifies the ON/OFF state of drivers 316 that drive the switches (SW1, SW2, SW3, SW4) in the converter 300. Each state other than STATE(0) also has a corresponding timer 306 (TIMER(1), TIMER(2), TIMER(3)). When a timer 306 times out, an OR-gate 318 and a pulse generator 320 generate a timer trigger 322 that initiates the next state in the sequence. An additional timer 324 (referred herein as a state duration limit timer) limits the duration of STATE(2), as will be discussed in more detail below.

There are Four States as Follows:

TABLE 1

| STATE/FUNCTION | SWITCH STATE |
|---|---|
| STATE(0) | ALL SWITCHES OFF |
| STATE(1) Boost Energize | SW1 & SW2 ON; SW3 & SW4 OFF |
| STATE(2) Pass, Buck Energize, Boost De-Energize | SW1 & SW4 ON; SW2 & SW3 OFF |
| STATE(3) Buck De-Energize | SW1 & SW2 OFF; SW3 & SW4 ON |

There are Three Timers Associated with Corresponding States, as Follows:

TABLE 2

| TIMER/FUNCTION | TIMING |
|---|---|
| TIMER(1) Boost Energize | Inversely proportional to magnitude of $V_{IN}$ |
| TIMER(2) Buck Energize or Boost De-Energize | Inversely proportional to magnitude of $V_{IN} - V_{OUT}$ |
| TIMER(3) Buck De-Energize | Inversely proportional to magnitude of $V_{OUT}$ |

STATE(0) is a power-down state (or standby state or passive state), and is also used in a low-power skip-mode. In STATE(0), all switches (SW1, SW2, SW3, SW4) are OFF. In STATE(1), using TIMER(1), the inductor L is effectively connected across $V_{IN}$ causing a positive build-up of inductor current. In STATE(2), using TIMER(2), the inductor L is connected between $V_{IN}$ and $V_{OUT}$. STATE(2) is used for three different functions, depending on the mode, but TIMER(2) is used for all three functions. During buck mode, STATE(2) is a buck energizing state, causing a positive build-up of inductor current. During boost mode, STATE(2) is a boost de-energizing state, where energy is transferred from the inductor L to the load. During buck-boost mode, STATE(2) is a pass mode in which the inductor current may be increased or decreased depending on the sign of $V_{IN} - V_{OUT}$. In STATE(3), using TIMER(3), the inductor L is connected across $V_{OUT}$. In STATE(3), energy is transferred from the inductor L to the load.

Figure 5:
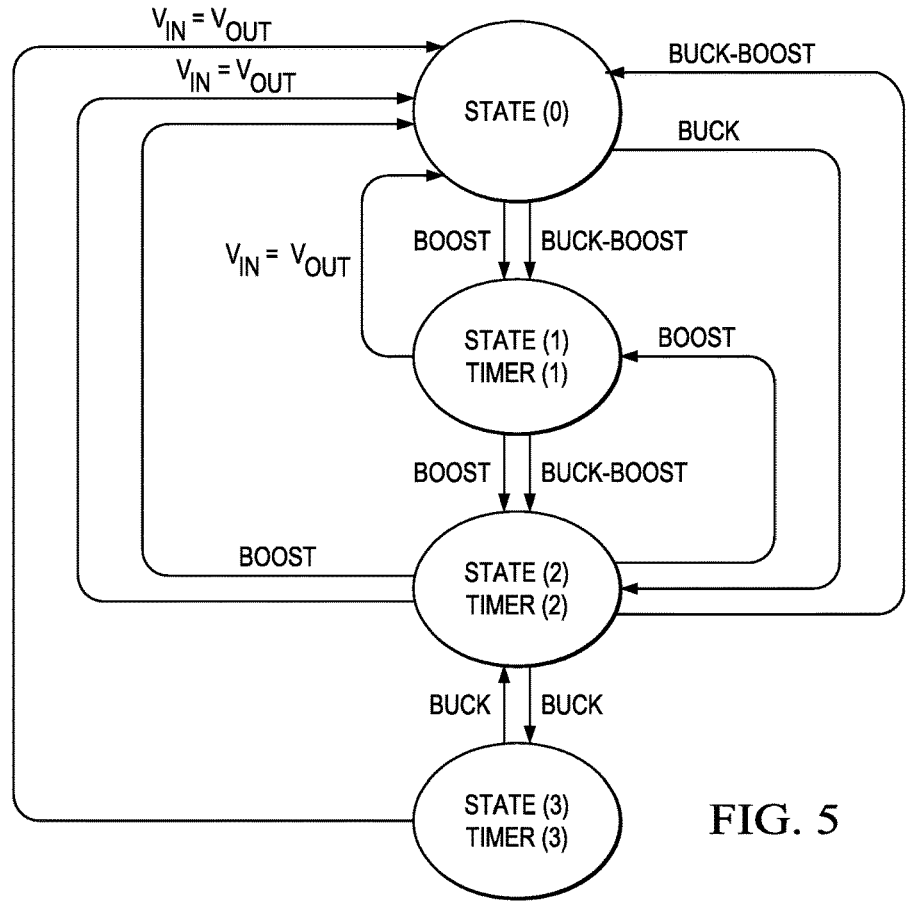
FIG. 5 is an example state diagram for a state machine in the controller of FIG. 3

FIG. 5 is a state diagram illustrating the four states, the sequence of states, and their associated timers. STATE(0) is the default state and all other states revert back to STATE(0) if $V_{OUT} = V_{IN}$. In buck mode, the state transitions from STATE(0) to STATE(2) and then the states alternate between STATE(2) and STATE(3). In boost mode, the state transitions from STATE(0) to STATE(1), and then the states alternate between STATE(1) and STATE(2). In buck-boost mode, the state transitions from STATE (0) to STATE(1), then to STATE(2), and then back to STATE(0).

Figure 2A:
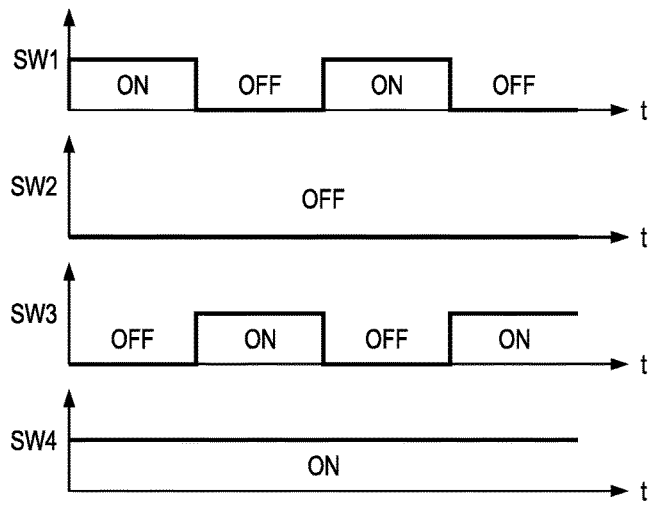
FIG. 2A is a timing diagram for the converter of FIG. 1 operating in buck mode.
Figure 2B:
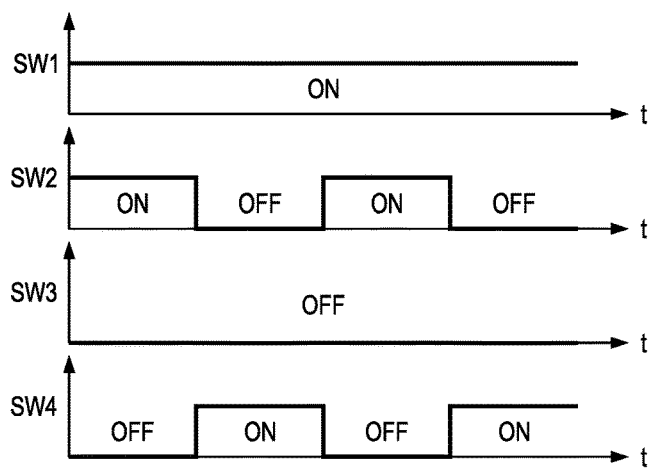
FIG. 2B is a timing diagram for the converter of FIG. 1 operating in boost mode.

In buck mode and boost mode, the switching sequence for the controller 302 is the same as described above for a conventional controller 102 as illustrated in FIG. 2A and FIG. 2B. However, in a conventional controller 102, a closed-loop system adjusts the switching duty cycle based on the difference between $V_{OUT}$ and a reference voltage $V_{REF}$. In contrast, in controller 302, a difference between $V_{OUT}$ and $V_{REF}$ triggers one cycle (a sequence of two states or three states, depending on the mode), and the sequence will be repeated with varying timers (timers varying with $V_{IN}$ and $V_{OUT}$ as described in TABLE 2), or if $V_{OUT} = V_{IN}$ then the state automatically reverts to STATE(0) (effectively a skip mode).

Figure 2C:
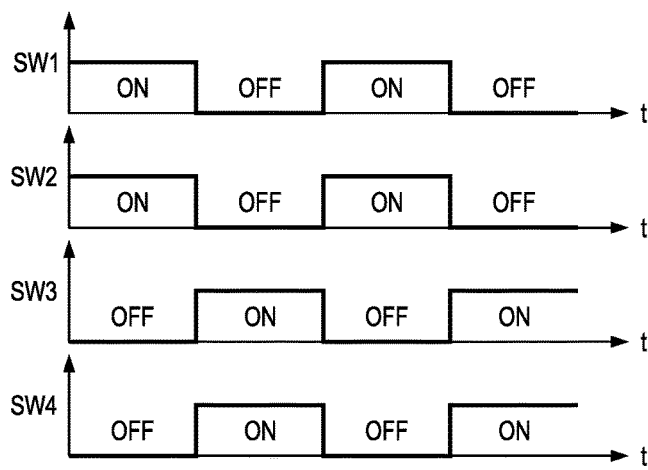
FIG. 2C is a timing diagram for the converter of FIG. 1 operating in buck-boost mode.
Figure 6:
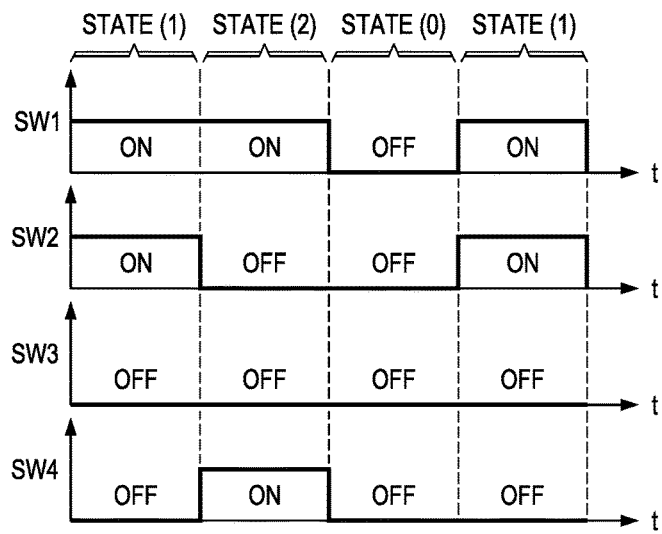
FIG. 6 is an example timing diagram for the controller/converter of FIG. 3 operating in buck-boost mode.

FIG. 6 illustrates the sequence of switch states for the controller 302 in buck-boost mode. Note that the switching sequence in buck-boost mode for controller 302 in FIG. 6 is different than the switching sequence in buck-boost mode for a conventional controller 102 as illustrated in FIG. 2C. The different switching sequence provides several advantages. In FIG. 6, the state sequence is STATE(1)-STATE(2)-STATE(0). That is, initially inductor current increases in STATE(1), the inductor is switched to the load during STATE(2), and then in STATE(0) all the switches open. In buck-boost mode, when $V_{IN} > V_{OUT}$, no energy transfers from the inductor L to the load during STATE(2) and instead current in the inductor L continues to increase. When the controller 302 switches from STATE(2) to STATE(0), the inductor L de-energizes into the power supply as follows. When the switches are opened in STATE(0) the current decreases and a voltage is generated across the inductor L (V=L*di/dt). The generated voltage causes the voltage at the node of the inductor L that is connected to switch SW3 to fall below ground, and the voltage at the node of the inductor L that is connected to switch SW4 to rise above the supply voltage, so that the inductor L discharges through back-diodes in the gates of switches SW3 and SW4.

For a fixed frequency system using the switching sequence of FIG. 2C, as $V_{IN} - V_{OUT}$ approaches zero, the ON time for switches SW1 and SW2 becomes very short. As a result, there is very little current build-up in the inductor L. In contrast, in the switching sequence of FIG. 6, current is allowed to build up during STATE(1) and any excess current is discharged during STATE(0) as described above. As a result, there is more stored energy in the inductor L to respond to a dynamic load change when needed.

As discussed above, it is desirable to maintain a constant switching cycle frequency. Accordingly, the timers are adjusted so that the STATE(2)-STATE(3) sequence in buck mode, the STATE(1)-STATE(2) sequence in boost mode, and the STATE(1)-STATE(2)-STATE(0) sequence in buck-boost mode all require approximately the same amount of total time. In buck-boost mode, TIMER(2) is inversely proportional to the magnitude of $V_{IN} - V_{OUT}$. As $V_{IN} - V_{OUT}$ approaches zero, TIMER(2) may become very long, resulting in a long cycle time. In controller 302, the state duration limit timer 324 is used to limit the time in STATE(2) while ensuring that the inductor L de-energizes. That is, the state duration limit timer 324 is used to ensure an approximately constant switching cycle time period even when $V_{IN} - V_{OUT}$ approaches zero. The state duration limit timer 324 starts when STATE(2) is triggered in buck-boost mode. If TIMER (2) expires before the state duration limit timer 324 expires, then STATE(0) is triggered when TIMER(2) expires. If the state duration limit timer 324 expires before TIMER(2) expires, then STATE(2) is terminated and STATE(0) is triggered when the state duration limit timer 324 expires.

As a result of controller 302 using a state machine 304 with timers 306, and the switching sequence of FIG. 6, operation across buck, buck-boost, and boost modes is seamless. The control scheme eliminates the need for complex mode-change circuitry and current reversal measurement. In addition, an inherent property of the control scheme is that when the converter 300 is in a light-load condition, the controller 302 automatically maintains the converter 300 in a discontinuous conduction mode (DCM) without requiring measurement of inductor current. In addition, during light-load conditions, the controller 302 operates at an approximately constant switching frequency while maintaining enough inductor current to respond to load transients.

Figure 7:
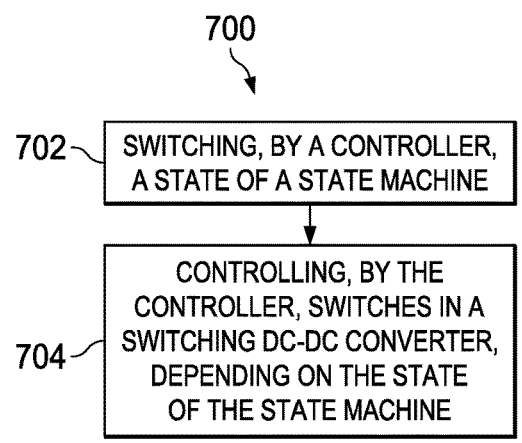
FIG. 7 is a flow chart of an example method for controlling a buck-boost DC-DC voltage converter.

FIG. 7 is a flow chart for an example embodiment of a method 700 of controlling a buck-boost DC-DC converter. At step 702 a controller switches the state of a state machine. At step 702, the controller controls switches in a DC-DC converter, depending on the state of the state machine.

Although illustrative embodiments have been shown and described by way of example, a wide range of alternative embodiments is possible within the scope of the foregoing disclosure.

What is claimed is:

1. A controller for a DC-DC converter, the controller comprising:
   a state machine;
   a plurality of drivers for controlling switches in the DC-DC converter, where each state in the state machine determines a state of the drivers; and
   a plurality of timers, where each state in the state machine, other than a passive state, has an associated timer for the state of the drivers.

2. The controller of claim 1, where a duration of at least one timer is determined by a magnitude of an input voltage to the DC-DC converter.

3. The controller of claim 1 where a duration of at least one timer is determined by a magnitude of an output voltage from the DC-DC converter.

4. The controller of claim 1, where a duration of at least one timer is determined by a magnitude of a difference between an input voltage to the DC-DC converter and an output voltage from the DC-DC converter.

5. The controller of claim 4, where a state duration limit timer limits the duration of the at least one timer having a duration that is determined by the magnitude of the difference between the input voltage to the DC-DC converter and the output voltage from the DC-DC converter.

6. The controller of claim 1, where a sequence of states in the state machine is dependent on a magnitude of a difference between an input voltage to the DC-DC converter and an output voltage from the DC-DC converter.

7. The controller of claim 1, where a sequence of states in the state machine is triggered when an input voltage to the DC-DC converter is different than an output voltage from the DC-DC converter.

8. The controller of claim 7, where a sequence of three states is triggered when a magnitude of a difference between the input voltage to the DC-DC converter and the output voltage from the DC-DC converter is less than a predetermined threshold.

9. The controller of claim 8, where one of the three states is the passive state.

10. The controller of claim 8, where a time that one of the three states is active is limited to a predetermined maximum duration.

11. The controller of claim 1, where the state machine reverts to the passive state when an input voltage to the DC-DC converter is equal to an output voltage from the DC-DC converter.

12. A method, comprising:
   switching, by a controller, a state from a plurality of states of a state machine;
   controlling, by the controller, switches in a switching DC-DC converter, depending on the state of the state machine; and
   controlling, by the controller, a duty cycle of the switches using timers associated with the plurality of states of the state machine.

13. The method of claim 12, where a sequence of states depends on a magnitude of a difference between an output voltage of the switching DC-DC converter and an input voltage of the switching DC-DC converter.

14. The method of claim 12, further comprising:
   switching, by controller, from a passive state in which all switches are OFF to a state in which at least one switch is ON when an output voltage of the DC-DC converter is different than a reference voltage.

15. The method of claim 12, further comprising:
   using a state duration limit timer, by the controller, to limit an ON-time for at least one other timer.

16. The method of claim 12, further comprising:
   controlling, by the controller, at least one of the switches to remain ON for two consecutive states when the controller is operating in a buck-boost mode.

17. The method of claim 12, further comprising:
   controlling, by the controller, all of the switches to remain OFF during at least one state when the controller is operating in a buck-boost mode.

* * * * *